US010623953B1

(12) United States Patent
Khanna

(10) Patent No.: US 10,623,953 B1
(45) Date of Patent: Apr. 14, 2020

(54) SYSTEM, METHOD, AND COMPUTER PROGRAM FOR PERFORMING WIFI DEVICE AUTHENTICATION UTILIZING A CALLING LINE IDENTIFICATION (CLI) AS A PASSCODE

(71) Applicant: Amdocs Development Limited, Limassol (CY)

(72) Inventor: Nitin Khanna, New Delhi (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 161 days.

(21) Appl. No.: 15/858,708

(22) Filed: Dec. 29, 2017

Related U.S. Application Data

(60) Provisional application No. 62/456,063, filed on Feb. 7, 2017.

(51) Int. Cl.
*H04W 12/06* (2009.01)
*H04L 29/06* (2006.01)
*H04W 84/12* (2009.01)
*H04W 4/02* (2018.01)

(52) U.S. Cl.
CPC .......... *H04W 12/06* (2013.01); *H04L 63/083* (2013.01); *H04L 63/0876* (2013.01); *H04L 2463/082* (2013.01); *H04W 4/02* (2013.01); *H04W 84/12* (2013.01)

(58) Field of Classification Search
CPC ... H04W 64/00; H04W 92/045; H04W 12/06; H04W 76/01; H04L 63/20
USPC .......................................................... 726/7
See application file for complete search history.

(56) References Cited

U.S. PATENT DOCUMENTS

| | | | |
|---|---|---|---|
| 2002/0054150 A1* | 5/2002 | I' Anson | H04W 64/00 715/810 |
| 2002/0147000 A1 | 10/2002 | Holmes-Kinsella | |
| 2010/0290390 A1* | 11/2010 | Souissi | H04W 12/0808 370/328 |
| 2011/0014894 A1* | 1/2011 | Batkin | H04W 92/045 455/410 |
| 2011/0246366 A1 | 10/2011 | Lai | |
| 2013/0024915 A1* | 1/2013 | Jones | H04W 12/06 726/5 |
| 2014/0254364 A1* | 9/2014 | Xiang | H04W 48/06 370/232 |
| 2014/0365669 A1* | 12/2014 | Shamis | H04W 76/18 709/227 |
| 2016/0142536 A1 | 5/2016 | Bendi et al. | |
| 2016/0143028 A1* | 5/2016 | Mancuso | H04L 63/20 370/338 |

FOREIGN PATENT DOCUMENTS

WO 2005076930 A2 8/2005

* cited by examiner

*Primary Examiner* — Bryan F Wright
(74) *Attorney, Agent, or Firm* — Zilka-Kotab, PC

(57) ABSTRACT

A system, method, and computer program product are provided for performing WiFi device authentication utilizing a calling line identification (CLI) as a passcode. When a request is received from a WiFi only device to access the Internet via a WiFi hotspot, a call is made to a mobile number of a mobile device that was specified in the request, wherein the call is made from a calling line identification randomly selected from a plurality of calling line identifications. The calling line identification is then usable by the WiFi only device as a passcode to access the Internet via the WiFi hotspot.

19 Claims, 7 Drawing Sheets

SYSTEM, METHOD, AND COMPUTER PROGRAM FOR PERFORMING WIFI DEVICE AUTHENTICATION UTILIZING A CALLING LINE IDENTIFICATION (CLI) AS A PASSCODE

CLAIM OF PRIORITY AND RELATED APPLICATIONS

This application claims the benefit of U.S. Provisional Application No. 62/456,063, filed Feb. 7, 2017, the entire contents of which are incorporated herein by reference.

FIELD OF THE INVENTION

The present invention relates to access point authentication of WiFi devices, and more particularly to performing WiFi device authentication utilizing a calling line identification as a passcode.

BACKGROUND

Many times, a mobile user may wish to access a service provider's WiFi network on the user's personal WiFi only device, such as a laptop or tablet. This may occur when the user is roaming abroad at places such as an airport or in an area near a public WiFi hotspot of a roaming partner. Cost of data over a cell network using a wireless device will be higher than using the WiFi network. Additionally, the user may wish to grant access to family members' devices, such as a smartphone of a spouse and tablet of child, etc. To date, there is not an efficient way to accomplish these goals.

There is thus a need for addressing these and/or other issues associated with the prior art.

SUMMARY

A system, method, and computer program product are provided for performing WiFi device authentication utilizing a calling line identification (CLI) as a passcode. In operation, a system identifies a request from a WiFi only device to access the Internet via a WiFi hotspot. The system identifies a mobile number entry associated with a mobile device. The mobile number entry is a mobile number associated with the mobile device that was input by a user associated with the WiFi only device in response to a passcode request for accessing the Internet via the WiFi hotspot. The system causes a call to the mobile device upon authenticating criteria associated with the mobile number entry and the mobile device, wherein the call is associated with a randomly selected calling line identification from a plurality of calling line identifications. Further, the system causes display of a prompt on the WiFi only device for a user to enter the calling line identification as a passcode for accessing the Internet via the WiFi hotspot. Additionally, the system authorizes the WiFi only device to access the Internet via the WiFi hotspot upon receipt of the calling line identification as the passcode.

DETAILED DESCRIPTION

Figure 1:
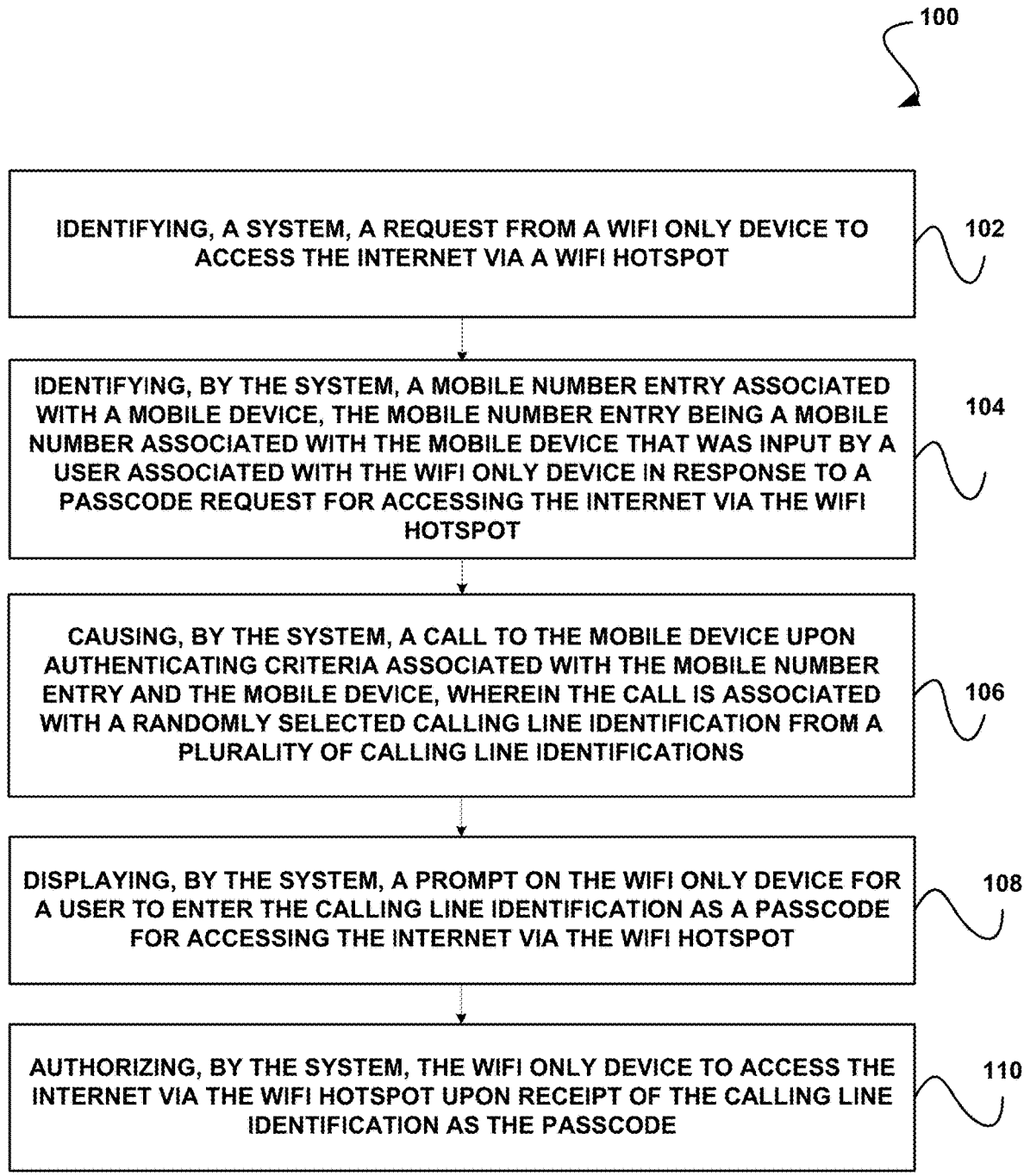
FIG. 1 illustrates a method for performing WiFi device authentication utilizing a calling line identification (CLI) as a passcode, in accordance with one embodiment.

FIG. 1 illustrates a method 100 for performing WiFi device authentication utilizing a calling line identification (CLI) as a passcode, in accordance with one embodiment.

In operation, a system identifies a request from a WiFi only device to access the Internet via a WiFi hotspot. See operation 102. The WiFi only device may include any device with WiFi access capability, but without cellular access capability. For example, the WiFi only device may include a tablet computer, laptop computer, and/or various other WiFi enabled devices. The WiFi hotspot may be associated with any location and/or business, etc.

As shown further in FIG. 1, the system identifies a mobile number entry associated with a mobile device. See operation 104. The mobile number entry is a mobile number associated with the mobile device that was input by a user associated with the WiFi only device in response to a passcode request for accessing the Internet via the WiFi hotspot. The mobile device may include any device associated with a mobile number, such as a smartphone, etc.

The system causes a call to the mobile device upon authenticating criteria associated with the mobile number entry and the mobile device. The call is associated with a randomly selected calling line identification from a plurality of calling line identifications. See operation 106.

Further, the system causes display of a prompt on the WiFi only device for a user to enter the calling line identification as a passcode for accessing the Internet via the WiFi hotspot. See operation 108.

Additionally, the system authorizes the WiFi only device to access the Internet via the WiFi hotspot upon receipt of the calling line identification as the passcode. See operation 110. In one embodiment, the authorizing may include utilizing a multi factor authentication for security. For example, the multi factor authentication may include the system determining a location associated with the mobile device. In this case, the location associated with the mobile device may be used to determine whether to authorize the WiFi only device to access the Internet via the WiFi hotspot, in addition to utilizing the calling line identification as the passcode.

The method 100 allows a system to authenticate a user's personal WiFi only device (e.g. laptop, tablet, etc.) in order to access a WiFi network of a service provider using a calling line identification of an incoming missed call from the service provider as the authentication passcode. In one embodiment, an existing authentication, authorization, and accounting (AAA) server product may be updated to perform this method, to filter new requests, and process them using a new "Mobile Authentication Module".

As an example implementation, a mobile device of a user may be authenticated at a WiFi hotspot using Radius EAP-SIM/AKA. The user may try to open a webpage using a WiFi only device at the WiFi hotspot and a login page with an authentication interface may be displayed.

The user may select authentication via a USSD passcode and enter a mobile number of the mobile device where the passcode is requested. The access point may send a Radius Access Request to the AAA server with 'DeviceName' in the User-Name AVP, 'Mobile Number' in the User-Password AVP, and 'CLIAuth' as a new Service-Type AVP (e.g. 20, etc.).

The AAA server may then check for the Service-Type AVP value and if it matches with the CLIAuth (e.g. 20, etc.), then the AAA server may send a request to a Mobile Authorization Module to send a missed call to the mobile device of the user using a random CLI from a pool of CLIs. Optionally, the AAA server can match the location of the wireless device and the WiFi only device for enhanced security.

The Mobile Authorization Module may alert the mobile device using a random CLI from the pool of CLIs with a single ring or two rings. The Mobile Authorization Module may send a success message with the CLI value in the response back to the AAA server.

The AAA server may send back an Access-Challenge Request to the access point. The access point may then display a web page to the end user of the WiFi only device to enter the CLI associated with the missed call came. The user may then enter the CLI as the passcode in the webpage and the access point may send back the passcode to the AAA server via an Access-Accept request.

The AAA server may then match the entered passcode with the return value from the Mobile Authorization Module. The AAA server may then send back an Access-Accept or Access-Reject accordingly. The access point may then display the authentication result to the WiFi only device over the webpage.

In one embodiment, this technique/method may be implemented using standard based solutions (e.g. Radius, etc.) with no proprietary interfaces for authentication. WiFi access may only be granted after passcode verification over a telecom network, and thus a layer of security is added. Moreover, there may be no roaming charges for an incoming voice call for performing the CLI based authentication using the mobile device. This technique may implement a multi-factor authentication for security, including using a mobile number, passcode, and device location.

By implementing the method 100, any end user may access a service provider WiFi network using personal WiFi only devices. The service provider can offer this feature so that their mobile users can share their data pack over WiFi with their personal WiFi only devices. Additionally, roamers can authorize their personal devices to access a service provider roaming partner WiFi network.

This solution requires no device database, always rings the primary device, and is able to authenticate WiFi devices using a CLI on a primary device as a password. Thus, a registered device may be called for authentication.

In one embodiment, the AAA server may query the HLR/HSS to obtain the mobile device location and match it if both the WiFi Only device and the mobile device for CLI based authentication are present at the same access point location. In one embodiment, this may be done before matching the passcode value received from the user.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc. Further, in one embodiment, the method 100 may be implemented utilizing a device that is not "WiFi only", but rather also has cellular and/or other wireless capability, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
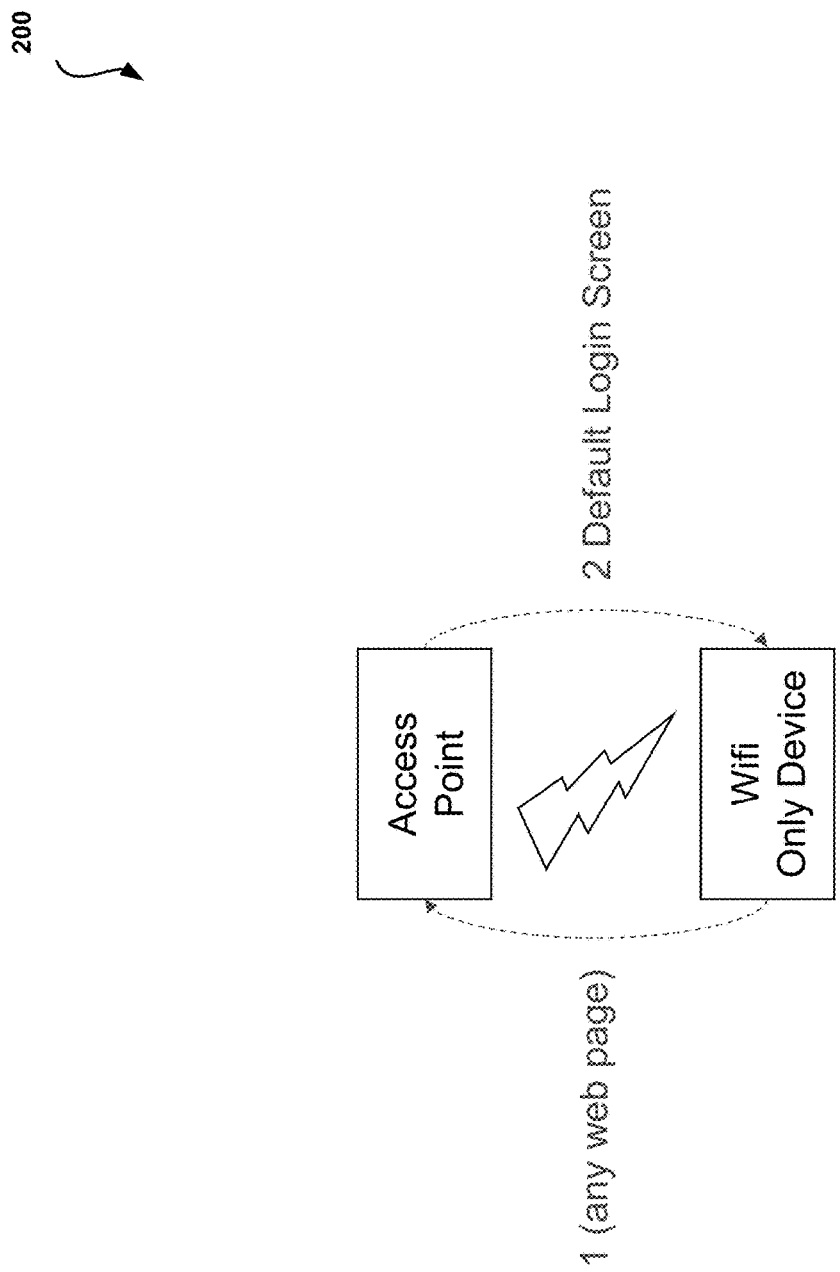
FIG. 2 shows a system flow diagram, in accordance with one embodiment.

FIG. 2 shows a system flow diagram 200, in accordance with one embodiment. As an option, the system flow diagram 200 may be implemented in the context of the details of the previous figure and/or any subsequent figure(s). Of course, however, the system flow diagram 200 may be implemented in the context of any desired environment. Further, the aforementioned definitions may equally apply to the description below.

As shown, a WiFi only device may attempt to open any web page via an access point and the access point may cause the display of a default login page on the WiFi only device.

Figure 3:
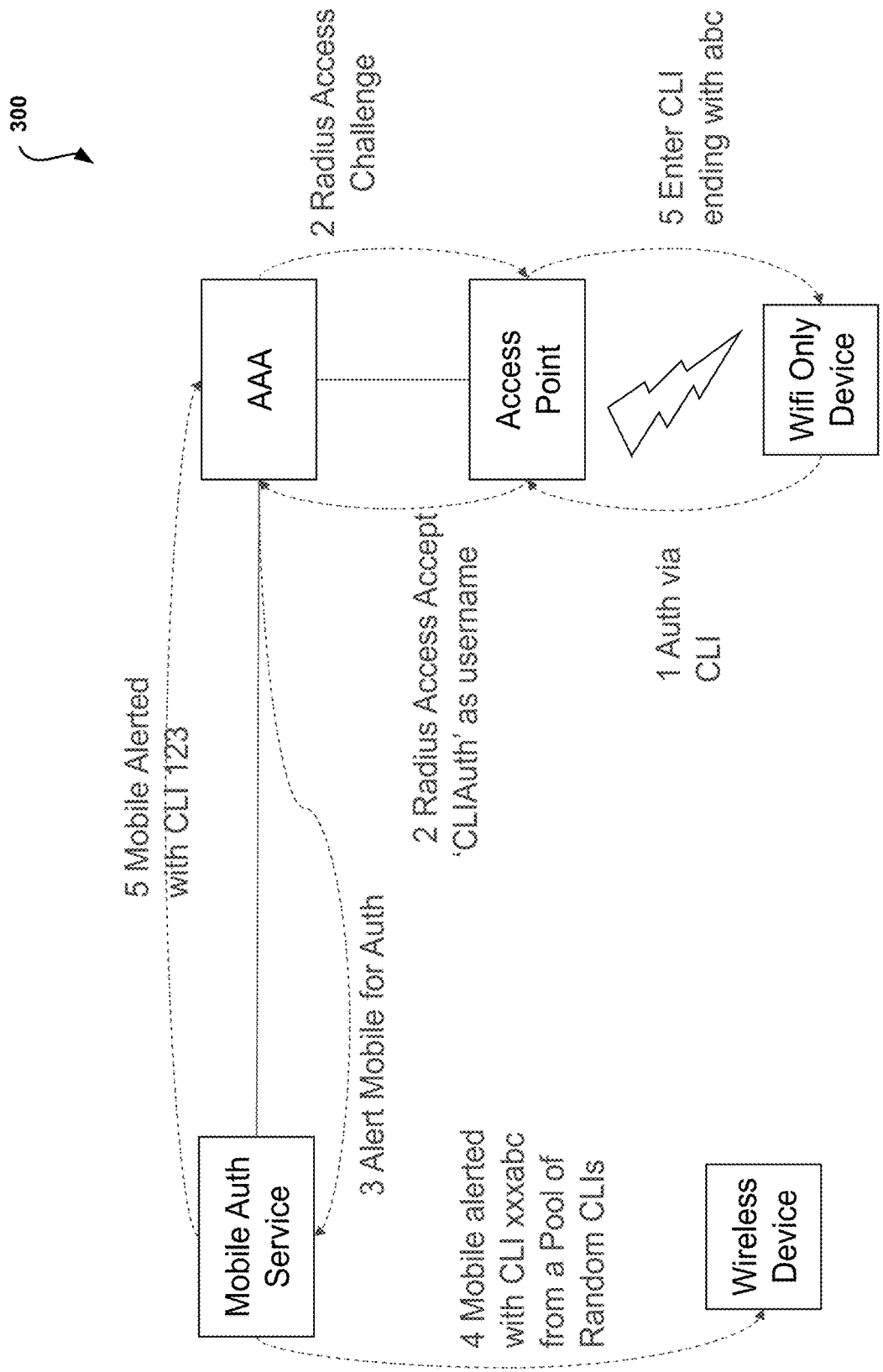
FIG. 3 shows a system flow diagram, in accordance with another embodiment.

FIG. 3 shows a system flow diagram 300, in accordance with one embodiment. As an option, the system flow diagram 300 may be implemented in the context of the details of the previous figures and/or any subsequent figure(s). Of course, however, the system flow diagram 300 may be implemented in the context of any desired environment. Further, the aforementioned definitions may equally apply to the description below.

FIG. 3 shows a system flow for performing missed call alerting to a mobile device. As shown, a WiFi only device requests authorization to an access point utilizing a CLI request. The access point receives a radius access challenge from an authentication, authorization, and accounting (AAA) server and responds with a Radius access accepting CLIAuth as the username. The AAA server alerts a mobile authorization service for authorization. The mobile authorization service alerts a wireless device associated with the WiFi only device with a CLI from a pool of random CLIs. The WiFi only device may then use this CLI for accessing the access point.

Figure 4:
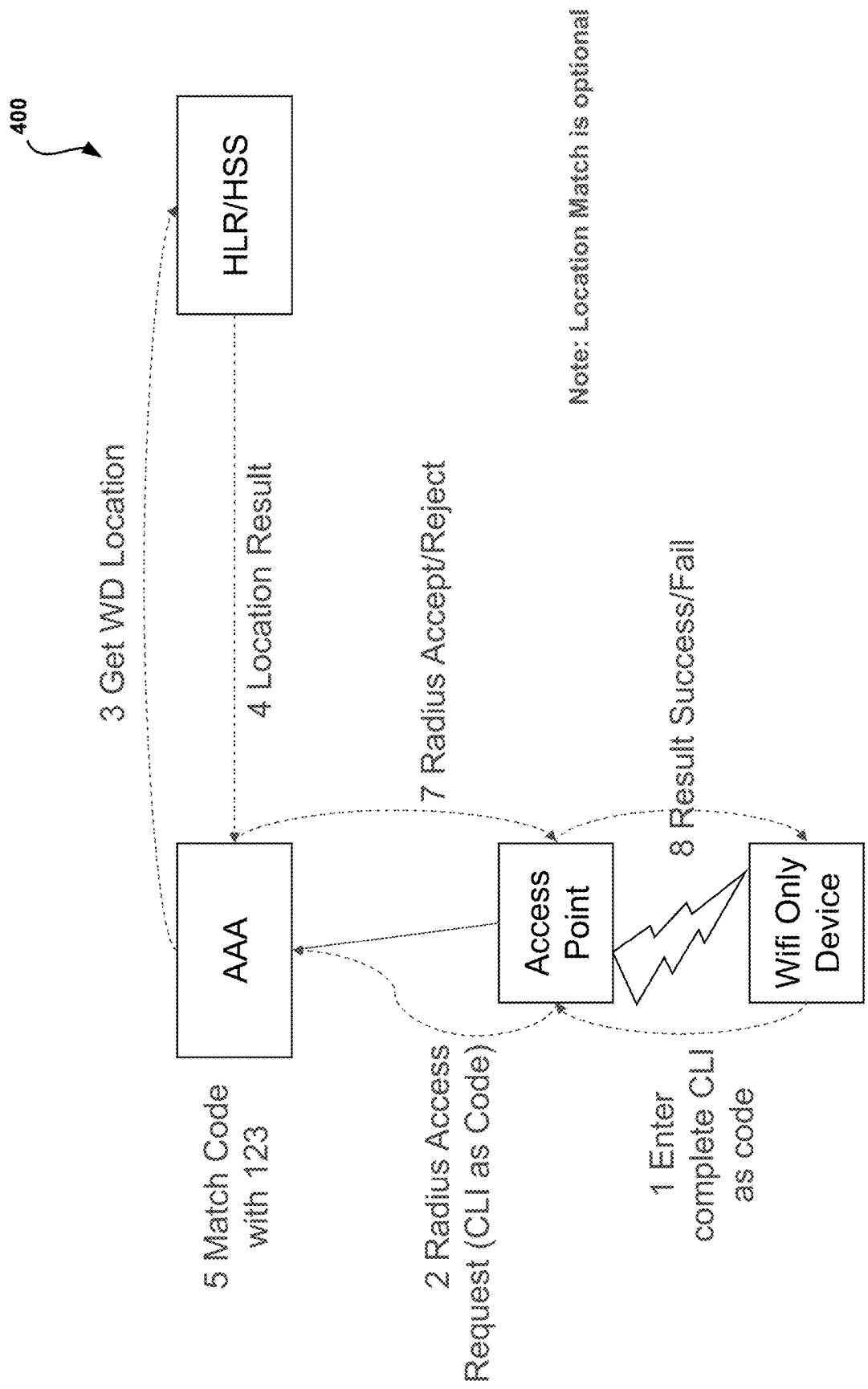
FIG. 4 shows a system flow diagram, in accordance with another embodiment.

FIG. 4 shows a system flow diagram 400, in accordance with one embodiment. As an option, the system flow diagram 400 may be implemented in the context of the details of the previous figures and/or any subsequent figure(s). Of course, however, the system flow diagram 400 may be implemented in the context of any desired environment. Further, the aforementioned definitions may equally apply to the description below.

FIG. 4 shows a system flow for performing WiFi only device authentication using a CLI as a passcode, with location match (optional). As shown, a WiFi only device uses a complete CLI as a code to access an access point. The access point sends a Radius access request using the CLI as a code to the AAA server. The AAA server obtains the location of a corresponding wireless device from a HLR/HSS system. The AAA matches the received code with the known code (e.g. from FIG. 3). The AAA server sends an accept/reject response to the access point, which in turn sends the result to the WiFi only device.

Figure 5:
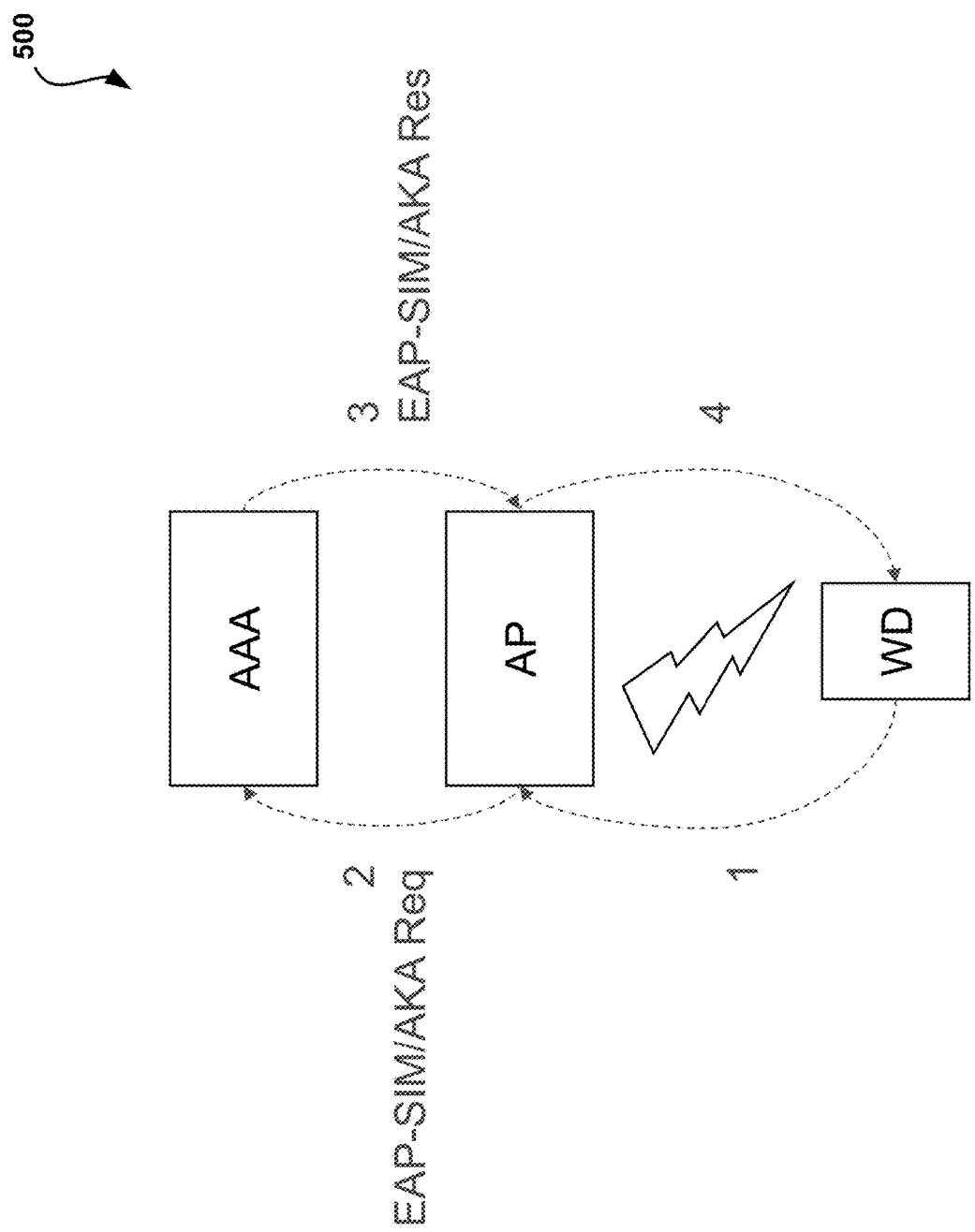
FIG. 5 shows a system flow diagram, in accordance with another embodiment.

FIG. 5 shows a system flow diagram 500, in accordance with one embodiment. As an option, the system flow diagram 500 may be implemented in the context of the details of the previous figures and/or any subsequent figure(s). Of course, however, the system flow diagram 500 may be implemented in the context of any desired environment. Further, the aforementioned definitions may equally apply to the description below.

FIG. 5 shows a system flow for performing mobile device registration on a WiFi network (optional for location match). As shown, a wireless device (WD, i.e. a mobile device) attempts to register with an access point. The access point sends an EAP-SIM/AKA request to the AAA server and the AAA server responds with an EAP-SIM/AKA response.

Figure 6:
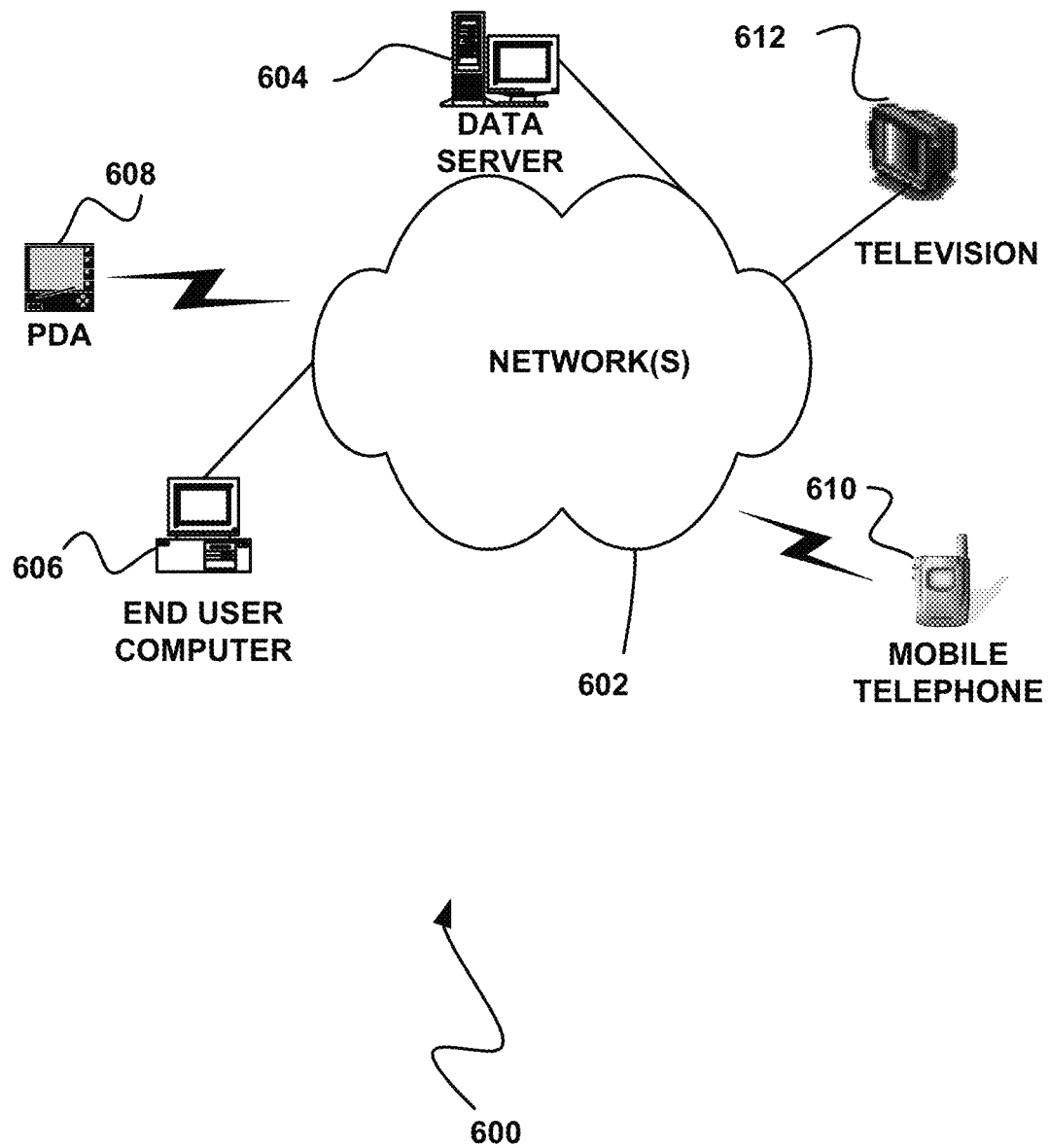
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
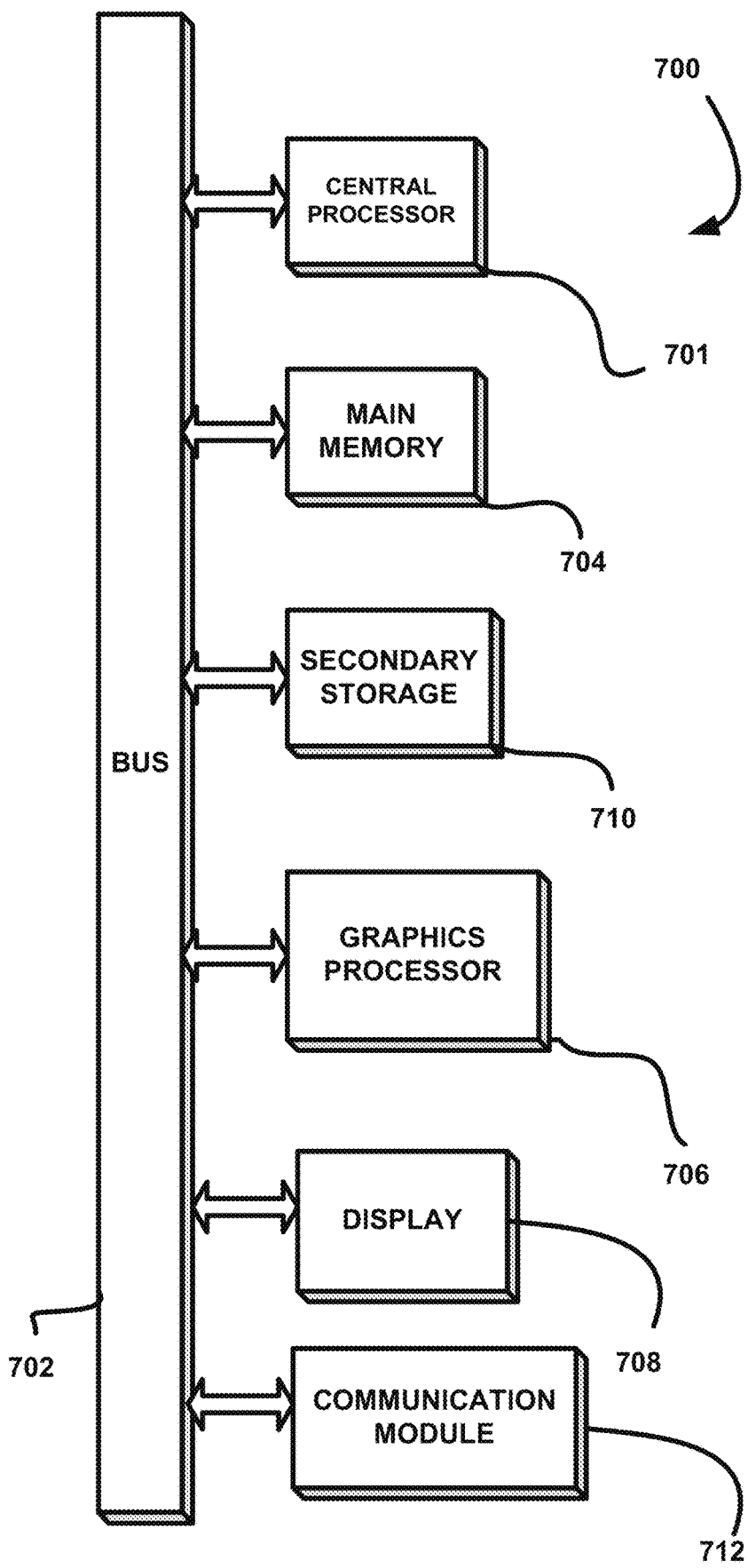
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 707.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a system, a request from a WiFi only device to access the Internet via a WiFi hotspot, the WiFi only device being equipped with WiFi access capability and without cellular access capability, and the request including
   a mobile number entry associated with a mobile device that is separate from the WiFi only device, the mobile number entry being a mobile number of the mobile device that was input by a user associated with the WiFi only device in response to a passcode request for accessing the Internet via the WiFi hotspot;
   causing, by the system, a call to the mobile number of the mobile device upon authenticating criteria associated with the mobile number entry and the mobile device, wherein the call is made from a calling line identification randomly selected from a plurality of calling line identifications;
   causing, by the system, display of a prompt on the WiFi only device for a user to enter the calling line identification as a passcode for accessing the Internet via the WiFi hotspot;
   receiving, by the system through the prompt, the calling line identification as the passcode; and
   authorizing, by the system, the WiFi only device to access the Internet via the WiFi hotspot upon receipt of the calling line identification as the passcode.

2. The method of claim 1, wherein the authorizing includes utilizing a multi factor authentication for security.

3. The method of claim 2, wherein the multi factor authentication includes determining a location associated with the mobile device.

4. The method of claim 3, wherein the location associated with the mobile device is used to determine whether to authorize the WiFi only device to access the Internet via the WiFi hotspot in addition to utilizing the calling line identification as the passcode.

5. The method of claim 1, wherein the WiFi only device includes a laptop computer.

6. The method of claim 1, wherein the WiFi only device includes a tablet computer.

7. The method of claim 1, wherein the mobile device includes a smartphone.

8. A computer program product embodied on a non-transitory computer readable medium, comprising computer code for:
   identifying, by a system, a request from a WiFi only device to access the Internet via a WiFi hotspot, the WiFi only device being equipped with WiFi access capability and without cellular access capability, and the request including
   a mobile number entry associated with a mobile device that is separate from the WiFi only device, the mobile number entry being a mobile number of the mobile device that was input by a user associated with the WiFi only device in response to a passcode request for accessing the Internet via the WiFi hotspot;
   causing, by the system, a call to the mobile number of the mobile device upon authenticating criteria associated with the mobile number entry and the mobile device, wherein the call is made from a calling line identification randomly selected from a plurality of calling line identifications;
   causing, by the system, display of a prompt on the WiFi only device for a user to enter the calling line identification as a passcode for accessing the Internet via the WiFi hotspot;
   receiving, by the system through the prompt, the calling line identification as the passcode; and
   authorizing, by the system, the WiFi only device to access the Internet via the WiFi hotspot upon receipt of the calling line identification as the passcode.

9. The computer program product of claim 8, wherein the authorizing includes utilizing a multi factor authentication for security.

10. The computer program product of claim 9, wherein the multi factor authentication includes determining a location associated with the mobile device.

11. The computer program product of claim 10, wherein the location associated with the mobile device is used to determine whether to authorize the WiFi only device to access the Internet via the WiFi hotspot in addition to utilizing the calling line identification as the passcode.

12. The computer program product of claim 8, wherein the WiFi only device includes a laptop computer.

13. The computer program product of claim 8, wherein the WiFi only device includes a tablet computer.

14. The computer program product of claim 8, wherein the mobile device includes a smartphone.

15. A system, comprising memory and one or more hardware processors operable for: identifying, by the system, a request from a WiFi only device to access the Internet via a WiFi hotspot, the WiFi only device being equipped with WiFi access capability and without cellular access capability, and the request including a mobile number entry associated with a mobile device that is separate from the WiFi only device, the mobile number entry being a mobile number of the mobile device that was input by a user associated with the WiFi only device in response to a passcode request for accessing the Internet via the WiFi hotspot;

causing, by the system, a call to the mobile number of the mobile device upon authenticating criteria associated with the mobile number entry and the mobile device, wherein the call is made from a calling line identification randomly selected from a plurality of calling line identifications;

causing, by the system, display of a prompt on the WiFi only device for a user to enter the calling line identification as a passcode for accessing the Internet via the WiFi hotspot;

receiving, by the system through the prompt, the calling line identification as the passcode; and authorizing, by the system, the WiFi only device to access the Internet via the WiFi hotspot upon receipt of the calling line identification as the passcode.

16. The method of claim 1, wherein the call is made to include a single ring.

17. The method of claim 1, wherein the call is made as an alert of a missed call showing the calling line identification randomly selected from the plurality of calling line identifications.

18. The method of claim 4, wherein the mobile device and the WiFi only device are required to determined to be present at a same access point location for authorizing the WiFi only device to access the Internet via the WiFi hotspot.

19. The method of claim 1, wherein the request from the WiFi only device to access the Internet via the WiFi hotspot is received via a webpage where the mobile number entry is input to the webpage where the passcode is requested.

\* \* \* \* \*